Feb. 6, 1962     G. A. LYON     3,020,090
WHEEL COVER
Filed Oct. 16, 1959
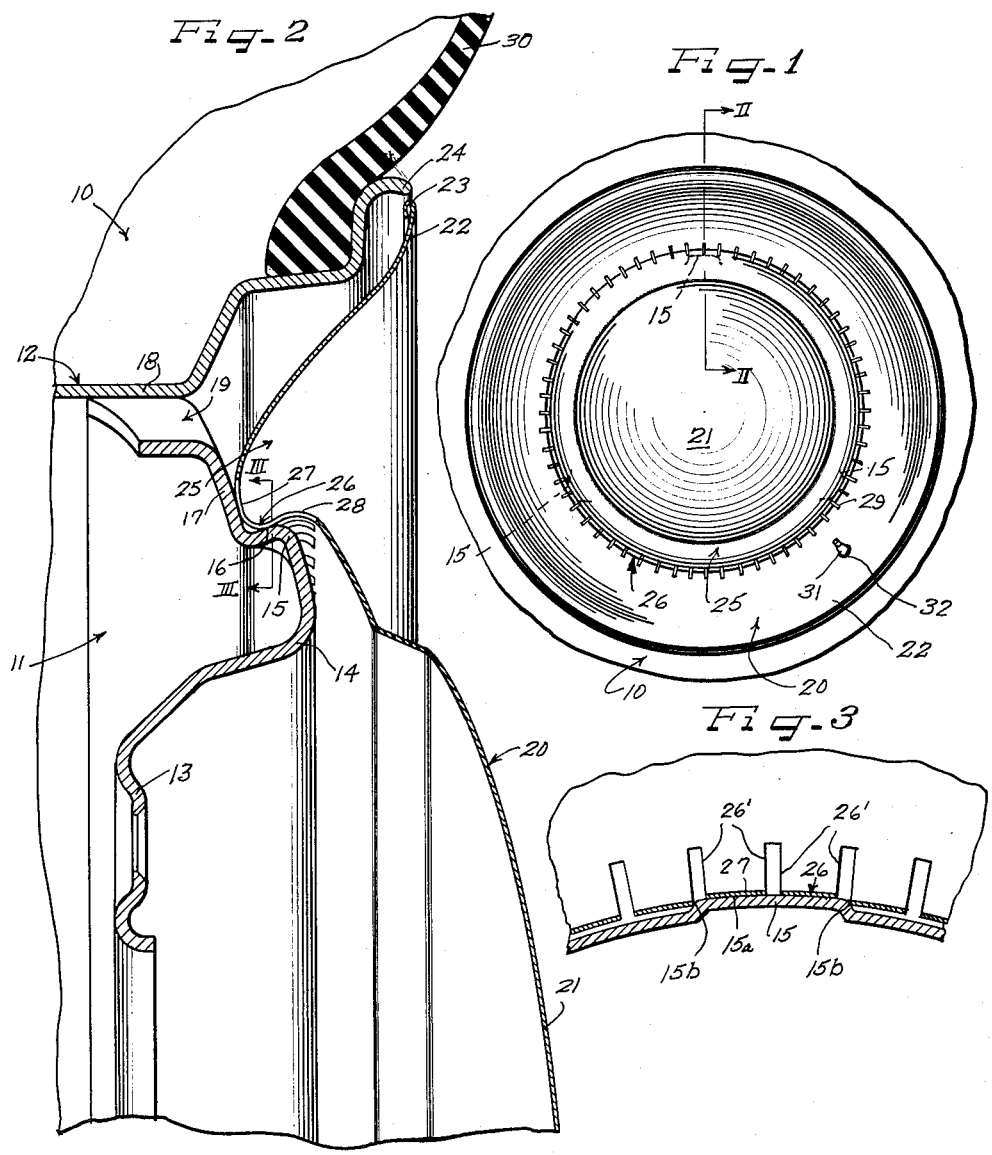
INVENTOR
George Albert Lyon
BY
ATTORNEYS

United States Patent Office 3,020,090
Patented Feb. 6, 1962

3,020,090
WHEEL COVER
George Albert Lyon, Detroit, Mich., assignor to Lyon Incorporated, Detroit, Mich., a corporation of Delaware
Filed Oct. 16, 1959, Ser. No. 846,859
11 Claims. (Cl. 301—37)

This invention relates generally to a wheel structure and more particularly to a wheel cover for overlying retained engagement upon a vehicle wheel.

The present invention concerns itself with a new and improved retaining action between an automobile wheel cover member and wheel. To this end, axially adjacent oppositely extending in a generally radial direction annular rib portions have been provided on the cover for retaining cooperation with circumferentially spaced bumps on the vehicle wheel.

An object of this invention is to provide a new and improved retaining action between a wheel cover and vehicle wheel.

Still another object of this invention is to provide a wheel cover which may be economically manufactured on a large production basis which is capable of efficient retaining cooperation with a vehicle wheel.

According to the general features of this invention there is provided in a wheel structure including a wheel having rim and body parts having radially facing rigid bumps, a cover for overlying disposition upon the wheel including axially adjacent oppositely extending in a generally radial direction annular rib portions with one of the rib portions being engageable behind the rigid bumps, and circumferentially spaced sets of edges defining slots extending through both of the rib portions to augment the resilient deflectability of same for detachable engagement behind the bumps and with the edges bearing against and cooperating with the sides of the bumps to resist circumferential movement and slippage of the cover relative to the bumps.

Other objects and features of the present invention will more fully become apparent in view of the following detailed description taken in conjunction with the accompanying drawing illustrating therein a single embodiment and in which:

FIGURE 1 is a side elevation of my wheel structure;

FIGURE 2 is an enlarged fragmentary cross sectional view taken substantially on the line II—II of FIGURE 1 looking in the direction indicated by the arrows; and FIGURE 3 is an enlarged fragmentary cross sectional view taken substantially on the line III—III of FIGURE 2, looking in the direction indicated by the arrows.

As shown on the drawing:

The reference numeral 10 indicates generally a wheel structure which includes a body part 11 and a stepped multi-flanged tire rim 12. The body part 11 has a central flange 13 which is adapted to be bolted to a vehicle axle. The body part 11 also has an annular bulged portion 14. Positioned on the radially outer side of the bulged portion 14 at circumferentially spaced intervals are bumps or retaining shoulders 15. It will be noted the cross section of the body part generally at the radially outer side of the bulged portion 14 is L-shaped including a first leg 16 junctioned at its axially inner end to a second generally radial leg 17. The body part 11 is connected to base flange 18 of the multi-stepped flanged tire rim 12 and the wheel is provided at the junction with circumferentially spaced wheel openings 19 which open axially inwardly to the brake drum area (not shown). Disposed on the outer side of the wheel structure is my cover 20 which may be made of any suitable material although it will be appreciated excellent results may be obtained through the making of the cover of spring stainless steel. This is true in view of the resilient characteristics of stainless steel and also because of the ease with which it may be polished to attain a highly attractive ornamental lustrous finish.

The cover member 20 has a raised central crown 21 and an outer margin 22, the margin 22 having a turned under beaded extremity 23 lying in close adjacency to terminal flange 24 of the tire rim 12. Disposed between the raised crown 21 and the outer margin 22 is an annular dished portion 25. Disposed on the radially inner side of the annular dished portion 25 are circumferentially spaced resiliently deflectable S-shaped cover retaining elements 26 together comprising an annular S-shaped portion. Each of the elements 26 includes contiguous axial bulges or rib portions 27 and 28, bulge 27 extending generally radially inwardly and bulge 28 extending generally radially outwardly. The rib portions 27 and 28 are each arcuate with the arcuate rib portion 27 having a smaller radius than the arcuate rib portion 28. Bulge 28 not only provides clearance for the cover in its assembly upon the wheel but also reinforces and backs up the retaining bulge or rib portion 27. Extending through the bulges 27 and 28 at circumferentially spaced intervals are elongated slots or slot areas 29 partially defined by the S-shaped axially extending circumferentially spaced marginal edges of circumferentially spaced elements or extension 26. The slots are particularly adapted to increase the resilient deflectability of the cover and which serve to divide the annular S-shaped portion into the circumferentially spaced elements 26. These slots 29 also to a certain extent are adapted to receive air therethrough when the wheel is rotated which air is directed through the wheel openings 19 onto the brake drum area (not shown). The slots 29 are defined by generally axially inwardly extending sets of edges 26' which edges are cooperable with the bumps 15 in such a manner so as to resist circumferential movement of the cover with respect to the wheel of the type which occurs when the vehicle on which the wheel is mounted is started abruptly or stopped abruptly.

The bumps 15 are provided with a top and sides, or top and side bump surfaces 15a and 15b, and the edges 26' are cooperable with these bump surfaces 15a and 15b when the cover is mounted on the wheel so as to insure that the cover will corotate with the wheel.

When the cover is assembled upon the wheel, the cover bulge 27 is adapted to flex radially outwardly and it is engaged and urged over the bumps 15 until the bulge portion or anular rib portion snaps behind the bumps into nested bottomed engagement therebehind and in nested backed-up engagement with the legs 16 and 17.

The cover may be removed from the wheel by inserting a suitable pry-off tool (not shown) underneath the beaded extremity 23 and upon the application of a suitable pry-off force the cover 20 may be ejected from the wheel.

The wheel structure 10 of the present invention and more particularly the multi-flanged tire rim 12 has mounted thereon a tire assembly 30 which may be either of the tube or tubeless type and which is adapted to be inflated by means of a valve stem 31 (FIGURE 1) which is adapted to extend through an opening 32 which is provided in the wheel cover 20.

The retaining means of the present cover has been found to be highly desirable in view of the easy-on hard-off retaining action which may be attained when the cover is mounted upon the wheel. By providing the slots 29 through the rib portions 27 and 28 the resilient deflectability of the retaining means has been augmented to help bring about a new and improved retaining action.

The present application for patent is a continuation-inpart of my earlier filed application for patent Ser. No. 586,535, filed May 22, 1956, which is now abandoned.

It will be understood that modifications and variations may be effected without departing from the scope of the novel concepts of the present invention.

I claim as my invention:

1. In a wheel structure including a wheel having rim and body parts having radially facing rigid bumps, a cover for overlying disposition upon the wheel including axially adjacent oppositely extending in a generally radial direction annular rib portions with one of said rib portions being engageable behind said rigid bumps, and circumferentially spaced sets of edges defining slots extending through both of said rib portions to augment the resilient deflectability of same for detachable engagement behind the bumps, and with at least some of said edges bearing against and cooperating with the bumps to resist circumferential movement and slippage of the cover relative to the bumps.

2. In a wheel structure including a wheel having rim and body parts with the body part having an L-shaped portion including a first leg portion extending generally radially outwardly and a second leg portion extending generally axially outwardly and providing a radially outwardly facing shoulder with circumferentially spaced bumps thereon, a stainless steel cover member for overlying retained disposition upon the wheel having an annular dished portion, and circumferentially spaced resiliently deflectable generally S-shaped cover retaining extensions, the extensions being comprised of connected axially inner and axially outer arcuate areas having different radii disposed generally at said annular dished portion, the axially inner arcuate areas being disposed in easy-on, hard-off cover retaining engagement behind the bumps.

3. In a wheel structure including a wheel having rim and body parts with the body part having an L-shaped portion including a first leg portion extending generally radially outwardly and a second leg portion extending generally axially outwardly and providing radially outwardly facing shoulder means, a cover member for overlying retained disposition upon the wheel having an annular dished portion and including a generally S-shaped cross-sectional resilient portion disposed generally at said annular dished portion with said S-shaped cross-sectional resilient portion including a generally radially inwardly bulged resilient rib portion in easy-on, hard-off cover retaining engagement behind the shoulder means, said generally S-shaped cross-sectional resilient portion having ornamental slots defined by sets of edges at circumferentially spaced intervals to augment the resilient deflectability of same to facilitate in the application and removal of the cover from the wheel and with at least some of said edges also cooperable with the shoulder means to resist circumferential relative rotational movement between the cover and the wheel.

4. In a wheel structure including a wheel having rim and body parts with the body part having an L-shaped portion including a first leg portion extending generally radially outwardly and a second leg portion extending generally axially outwardly and providing radially outwardly facing shoulder means, a cover member for overlying retained disposition upon the wheel having an annular dished portion and including a generally S-shaped cross-sectional resilient portion disposed generally at said annular dished portion with said S-shaped cross-sectional resilient portion including a generally radially inwardly bulged resilient rib portion in easy-on, hard-off cover retaining engagement behind the shoulder means, said generally S-shaped cross-sectional resilient portion having ornamental slots defined by sets of edges at circumferentially spaced intervals to augment the resilient deflectability of same to facilitate in the application and removal of the cover from the wheel and with at least some of said edges also cooperable with the shoulder means to resist circumferential relative rotational movement between the cover and the wheel, said dished portion being bottomed against said first leg with said bulged rib portion nestingly engaged with the junction of said legs behind said shoulder means.

5. In a wheel structure including a wheel having rim and body parts with the body part having an L-shaped portion including a first leg portion extending generally radially outwardly and a second leg portion extending generally axially outwardly and providing radially outwardly facing shoulder means, a cover member for overlying retained disposition upon the wheel having an annular dished portion and including a generally S-shaped cross-sectional resilient portion disposed generally at said annular dished portion with said S-shaped cross-sectional resilient portion including a generally radially inwardly bulged resilient rib portion in easy-on, hard-off cover retaining engagement behind the shoulder means, said generally S-shaped cross-sectional resilient portion having ornamental slots defined by sets of edges at circumferentially spaced intervals to augment the resilient deflectability of same to facilitate in the application and removal of the cover from the wheel and with at least some of said edges also cooperable with the shoulder means to resist circumferential relative rotational movement between the cover and the wheel, said slots including said edges being generally S-shaped and being elongated with respect to their width.

6. In a wheel structure including a wheel having rim and body parts with the latter having generally radially facing bumps, a stainless steel cover for overlying disposition upon the wheel having an intermediate resilient dished portion of generally S-shaped cross-section comprised of successive arcuate areas having different radii, said intermediate dished portion including a generally radially facing arcuate rib portion in easy-on, hard-off cover retaining engagement behind said bumps, said intermediate dished portion of S-shaped cross-section having ornamental slots defined by sets of edges at circumferentially spaced intervals to augment the resilient deflectability of said intermediate resilient dished portion to facilitate in the application and removal of the cover from the wheel and with at least one of said edges also cooperable with the bumps to resist circumferential relative rotational movement between the cover and the wheel.

7. A cover structure for disposition on the outer side of a vehicle wheel, a circular crown area and a radially outer annular area on the cover structure, and circumferentially spaced resiliently deflectable retaining extensions joined at their opposite ends with the circular crown area and the radially outer annular area to provide an integrated cover structure, the extensions each being S-shaped in configuration including axially inner and axially outer curved portions which curved portions on each of said extensions are bulged in radially opposite directions relative to one another.

8. In a wheel structure including a wheel having rim and body parts with the body part having an L-shaped portion including a first leg portion extending generally radially outwardly and a second leg portion extending generally axially outwardly and providing a radially outwardly facing shoulder with circumferentially spaced bumps thereon a stainless steel cover member for overlying retained disposition upon the wheel having an annular dished portion, and circumferentially spaced resiliently deflectable generally S-shaped cover retaining extensions, the extensions being comprised of connected axially inner and axially outer arcuate areas having different radii disposed generally at said annular dished portion, the S-shaped cover retaining extensions being separated from one another by S-shaped slot areas to augment the deflectability of the extensions with each of said extensions having S-shaped edges defining margins of a circumferentially spaced pair of said slot areas, the axially inner arcuate areas being disposed in easy-on, hard-off cover retaining engagement behind the bumps.

9. In a wheel structure including a wheel having rim and body parts with the latter having circumferentially spaced bumps, a wheel cover for overlying disposition upon the wheel having an intermediate resilient dished portion, the dished portion being provided with circumferentially spaced resiliently deflectable S-shaped cover retaining extensions, the S-shaped cover retaining extensions being separated from one another by S-shaped slot areas to augment the deflectability of the extensions with each of said extensions having S-shaped edges defining margins of a circumferentially spaced pair of said slot areas, the extensions being comprised of successive axially inner and axially outer arcuate areas having different radii, said axially inner arcuate areas comprising radially inwardly facing annular arcuate rib portions in easy-on, hard-off cover retaining engagement behind said shoulder means, at least some of said axially outer arcuate areas being bridged over said bumps to conceal the same.

10. In a wheel structure including a wheel having rim and body parts having radially facing rigid rounded shoulder means, a steel cover including inner and outer cover portions for overlying disposition upon the wheel, circumferentially spaced resiliently deflectable retaining extensions joining the radially inner and radially outer cover portions together, said extensions each including rib portions which rib portions are axially adjacent and oppositely extending generally in a radial direction, at least some of the radially innermost of said rib portions being engageable behind said rigid shoulder means and with the radially outermost of the rib portions being disposed radially outwardly of the shoulder means on the body part and overlying the shoulder means, said rib portions comprising arcs and being disposed between said inner and outer cover portions and smoothly blended therewith to avoid sharp corners.

11. In a wheel structure including a wheel having rim and body parts with the latter having radially outwardly facing shoulder means, a stainless steel cover for overlying coaxial disposition upon the wheel and having an intermediate resilient dished portion, the dished portion being provided with circumferentially spaced resiliently deflectable cover retaining extensions joining radially inner and radially outer cover portions together, the extensions extending generally axially of the cover and being comprised of successive axially inner and axially outer arcuate areas having different radii, said axially inner arcuate areas comprising radially inwardly facing annular arcuate rib portions in easy-on, hard-off cover retaining engagement behind said shoulder means.

References Cited in the file of this patent
UNITED STATES PATENTS

| | | |
|---|---|---|
| 2,020,885 | Gatta | Nov. 12, 1935 |
| 2,308,617 | Lyon | Jan. 19, 1943 |
| 2,444,054 | Lyon | June 29, 1948 |
| 2,799,536 | Lyon | July 16, 1957 |

FOREIGN PATENTS

| | | |
|---|---|---|
| 205,092 | Switzerland | Aug. 16, 1939 |